No. 751,382. PATENTED FEB. 2, 1904.
C. O. COUTS.
GRAFTING KNIFE.
APPLICATION FILED JULY 3, 1903.
NO MODEL.
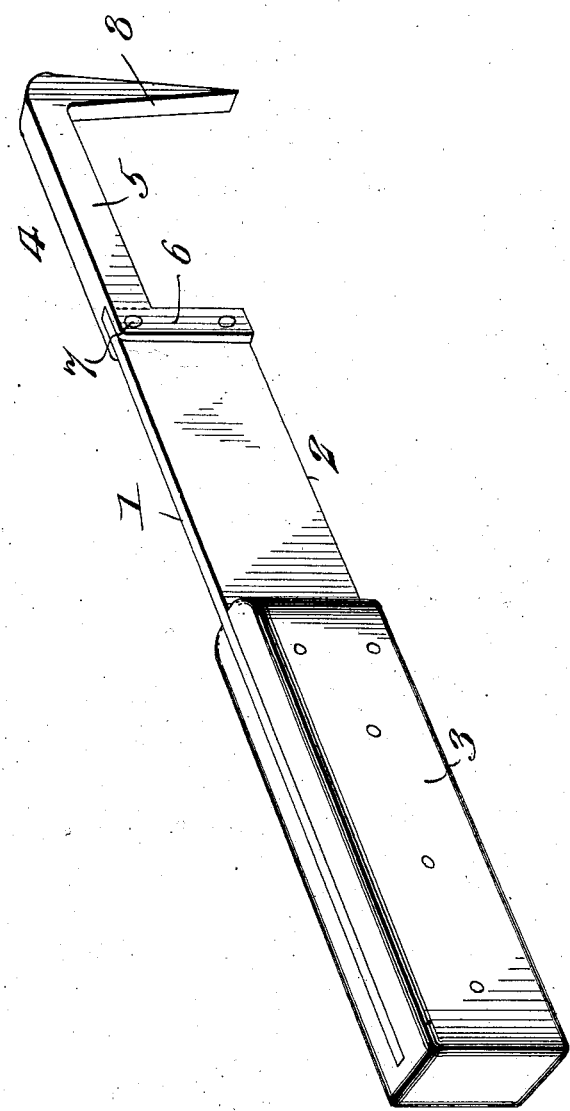
Witnesses
Willis Rockwell
Chas. S. Hyer.
Inventor
Charles O. Couts,
By Victor J. Evans
Attorney No. 751,382. Patented February 2, 1904.

UNITED STATES PATENT OFFICE.

CHARLES O. COUTS, OF NEW COMERSTOWN, OHIO.

GRAFTING-KNIFE.

SPECIFICATION forming part of Letters Patent No. 751,382, dated February 2, 1904.

Application filed July 3, 1903. Serial No. 164,210. (No model.)

*To all whom it may concern:*

Be it known that I, CHARLES O. COUTS, a citizen of the United States, residing at New Comerstown, in the county of Tuscarawas and State of Ohio, have invented new and useful Improvements in Grafting-Knives, of which the following is a specification.

This invention relates to a grafting-knife adapted for use in the operation of top grafting, and the object of the same is to provide a simple and effective device for conveniently splitting a tree or the limbs thereof and spreading the split portion to receive the graft and of such dimensions as to be conveniently carried in the pocket of the garments of the user while ascending and descending trees.

By the use of the improved knife any tree or limb can with the hands alone be easily split and spread, and thus dispense with the inconvenience attending the use of a mallet, as in the form of grafting-knives commonly used.

The invention consists in the construction and arrangement of the several parts, which will be more fully hereinafter described and claimed.

The drawing illustrates a perspective view of a knife embodying the features of the invention.

The numeral 1 designates the blade, having a cutting edge 2 similar to an ordinary knife, and a handle 3. A wedge attachment 4 is secured to the front terminal of the blade and consists of a shank 5, continuing into a rear socket 6, in which the front terminal of the blade 1 is fitted and secured by rivets 7 or other analogous fastenings. From the front end of the shank 5 a wedge 8 depends, the latter being considerably longer than the width of the blade, so as to be effective in setting up a wedging action by a considerable penetration into the split portion of the tree or limb.

In the operation of grafting with the improved knife the limb or tree is split by striking it with the cutting edge 2 of the blade 1, and the wedge 8 is then inserted into the split portion of the tree or limb to spread the cleft for the insertion of the graft, the usual operation incident to grafting then being pursued.

It is proposed to form the blade 1 and wedge attachment 4 of suitable metal, and the dimensions of the parts of the knife as an entirety are such that it may be easily inserted in a pocket of the garments of the user in ascending or descending trees. The wedge attachment in some instances may also conveniently serve as a hook for drawing limbs toward the operator, and when the limb or tree is too large to carry on a successful grafting operation with the improved knife the latter may be employed as a guide. It will be understood, however, that changes in the proportions and dimensions may be resorted to without departing from the spirit of the invention and that many changes incident to the improved knife will become apparent by its use.

Having thus fully described the invention, what is claimed as new is—

1. A grafting-knife having a blade with a cutting edge, and a wedge attachment secured to the front extremity of the blade and provided with a depending wedge of greater length than the width of the blade.

2. A grafting-knife, having a blade with a cutting edge and a wedge attachment secured to the front extremity of the blade.

In testimony whereof I affix my signature in presence of two witnesses.

CHARLES O. COUTS.

Witnesses:
 MARY BEERS,
 GEO. W. BEERS.